US006920508B1

(12) United States Patent
Müller

(10) Patent No.: US 6,920,508 B1
(45) Date of Patent: Jul. 19, 2005

(54) WDM RING NETWORK

(75) Inventor: Horst Müller, Hohenschäftlarn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,062

(22) PCT Filed: Aug. 4, 1999

(86) PCT No.: PCT/DE99/02442

§ 371 (c)(1),
(2), (4) Date: Feb. 28, 2001

(87) PCT Pub. No.: WO00/13361

PCT Pub. Date: Mar. 9, 2000

(30) Foreign Application Priority Data

Aug. 31, 1998 (DE) .......................................... 198 39 609

(51) Int. Cl.[7] .............................................. G06F 15/16
(52) U.S. Cl. ....................... 709/251; 370/403; 370/404; 370/405; 370/406; 370/351; 370/452; 370/453; 370/454; 370/455; 370/456; 370/222; 370/223; 370/224; 370/225; 370/226; 370/227; 370/228; 370/258
(58) Field of Search ................................. 370/403, 404, 370/405, 406, 351, 452–456, 222–228, 258, 85, 15, 71; 709/251; 359/118; 385/24

(56) References Cited

U.S. PATENT DOCUMENTS 5,159,595 A * 10/1992 Flanagan et al. ............ 370/224
5,517,498 A * 5/1996 Hauris et al. ................ 370/431
5,647,035 A * 7/1997 Cadeddu et al. .............. 385/24
6,233,074 B1 * 5/2001 Lahat et al. ................... 398/79
6,256,292 B1 * 7/2001 Ellis et al. ................... 370/227
6,728,205 B1 * 4/2004 Finn et al. ................... 370/217

FOREIGN PATENT DOCUMENTS

EP    0 716 521    6/1996
EP    0 729 247    8/1996

OTHER PUBLICATIONS

A.J. Ramos, "Optical Network Architecture: Routing and Protection" Proceedings of OADM Workshop, pp. 45–49, Pub: Apr. 23, 1998.
Johansson et al., "Flexible Bus: A Self–Restoring Optical ADM Ring Architecture", pp. 2338–2339, Pub: Dec. 5, 1996.
Magill, "A Bandwidth Efficient Self–Healing Ring for B–ISDN" IEEE International Conference on Communications (ICC) pp. 1572–1576, Pub: Jun. 8, 1997.
Nagatsu et al., "Architectural Analsysis of Multiple Fiber Ring Networks Employing Optical Paths", Journal of Lightwave Technology, pp. 1794–1804, Pub: Oct., 1997.
Wuttisittikulkj et al., "Mutliwavelength Self–Healing Ring Transparent Networks" IEEE Global Telecommunications Conference, pp. 45–49, Pub: Nov. 14, 1995.

* cited by examiner

Primary Examiner—John Follansbee
Assistant Examiner—Ashok B. Patel
(74) Attorney, Agent, or Firm—Bell Boyd & Lloyd LLC

(57) ABSTRACT

A WDM ring network and method for distributing within such ring network for feeding in data and for distributing both working signals and protection signals on different transmission paths and in oppositely directed transmission directions, and for forwarding data from subscribers and for distributing the working signals to the subscribers.

6 Claims, 5 Drawing Sheets

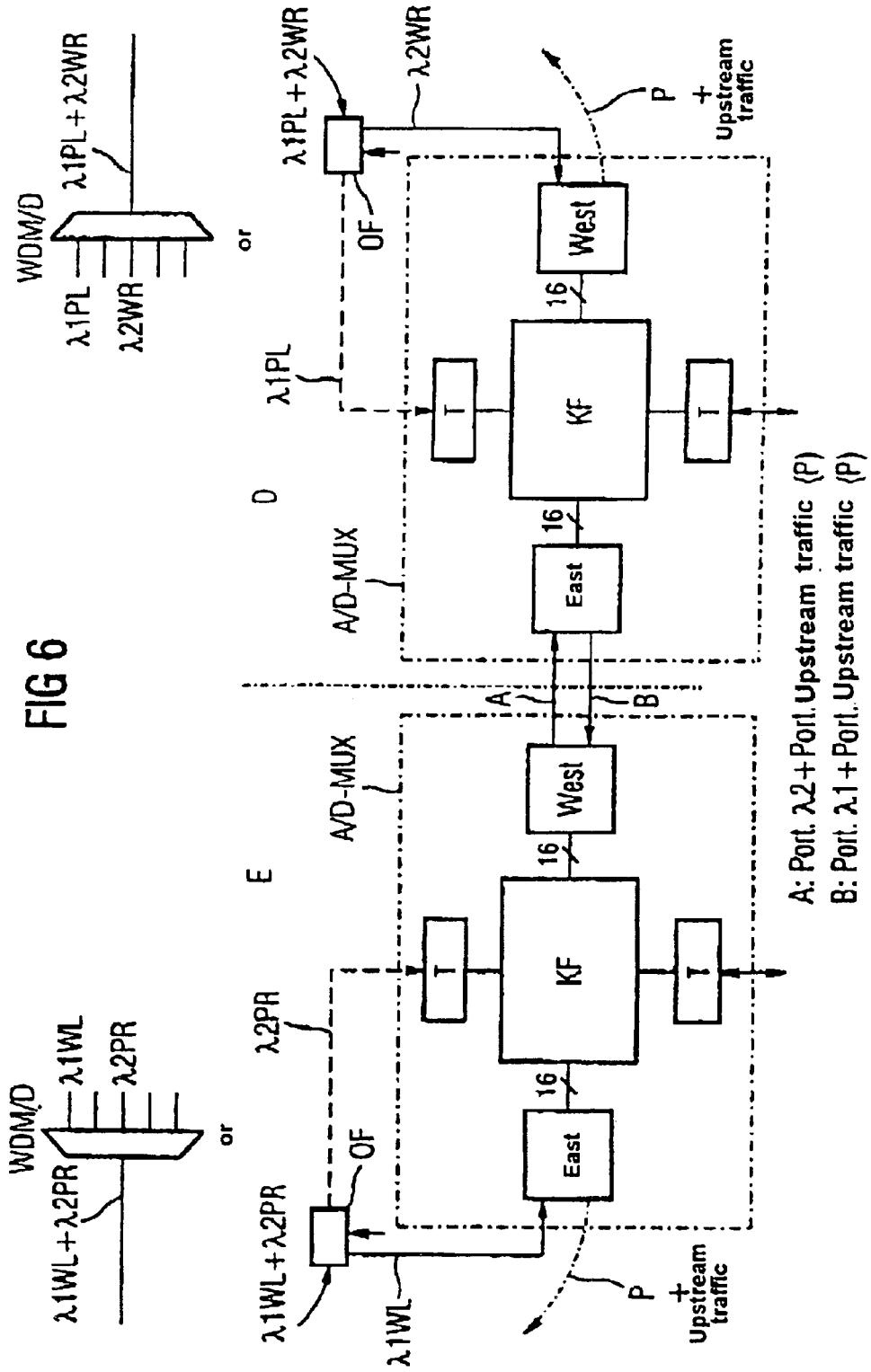

WDM RING NETWORK

BACKGROUND OF THE INVENTION

1. Field of the Invention

The present invention relates to a WDM ring network, and method, wherein the transmission capacity of such ring network, which is used predominantly for one-way data transport, can be taken advantage of.

2. Description of the Prior Art

In a ring network with predominantly one-way data transport, as in the case of data transport within the Internet or in the case of video distribution services, data is transmitted from a central network element, e.g. an internet server, toward the subscriber. In the case of the ring network utilization mentioned at the beginning, only very limited data transport takes place from a subscriber to the central network element.

However, conventional transmission methods in the synchronous digital hierarchy provide the same transmission capacity in the transmission direction both to and from the subscriber. Highly pronounced one-way data transport entails the disadvantage that almost half of the transmission capacity of the ring network remains unutilized.

The present invention is, therefore directed to a circuit arrangement and method with which the transmission capacity of a ring network with predominantly one-way data transport can be used.

SUMMARY OF THE INVENTION

Accordingly, the present invention is directed to a ring network which includes: a central network element for feeding in data and for distributing both working signals and protection signals on different transmission paths and in oppositely directed transmission directions, and wherein, proceeding from the central network element, the ring network is subdivided into a first part and a second part; a plurality of further network elements connected to subscribers for forwarding upstream data from the subscribers and for distributing the working signals to the subscribers; wherein the central network element feeds the working signals into the first and second parts of the ring network; wherein the central network element, in accordance with portions of the working signals fed into the first and second parts of the ring network, feeds the working signals as protection signals into the respective other part of the ring network; and wherein the further network elements forward the protection signals as far as the respective network element terminating the first and left-hand parts of the ring network, and the protection signals are fed into the respective other terminating network element of the first and second parts of the ring network and are forwarded counter to a transmission direction of the working signals to the central network element.

The present invention is further directed to a method for distributing data within a ring network for feeding in data and for distributing both working signals and protection signals on different transmission paths and in oppositely directed transmission directions and for forwarding data from subscribers and for distributing the working signals to the subscribers connected to network elements, the method including the steps of: subdividing the ring network into a first part and a second part; feeding the working signals into both the first and second parts of the ring network; feeding the working signals as protection signals into a respective other part of the ring network; forwarding the protection signals as far as the respective network element terminating the first and second parts of the ring network; feeding the protection signals into the respective other terminating network element of the first and second parts of the ring network; and forwarding the protection signals counter to a transmission direction of the working signals to the central network element.

The present invention entails the advantage that the transmission capacity with predominantly one-way data transport on the ring network is utilized, with transmission reliability remaining the same.

The present invention entails the advantage that data transport from the subscriber to the central network element of the ring is also possible.

Additional features and advantages of the present invention are described in, and will be apparent from, the following Detailed Description of the Preferred Embodiments and the Drawings.

DESCRIPTION OF THE DRAWINGS

FIG. 6 shows a further configuration of network elements which respectively terminate one half of the ring network.

DETAILED DESCRIPTION OF THE PREFERRED EMBODIMENTS

In the synchronous digital hierarchy SDH, use is preferably made of ring structures in which individual network elements for coupling out or coupling in data are integrated. The ring structure enables the transmission of data which, if they are transmitted directly to the subscriber, are designated as working signals. Owing to the high degree of data protection demanded, the data to be transmitted to the subscriber is also transmitted as protection signals on a second transmission path within the ring to the subscriber. This type of data transmission ensures a high degree of transmission reliability in the event of an interruption of the ring.

The present invention's method with associated circuit configuration will be explained in more detail using a ring structure with synchronous transfer mode STM data transmission.

First of all, in order to provide a better understanding of the present invention, all data transport directed one-way will be assumed, in which no data transport takes place from a subscriber to the central network element.

Figure 1:
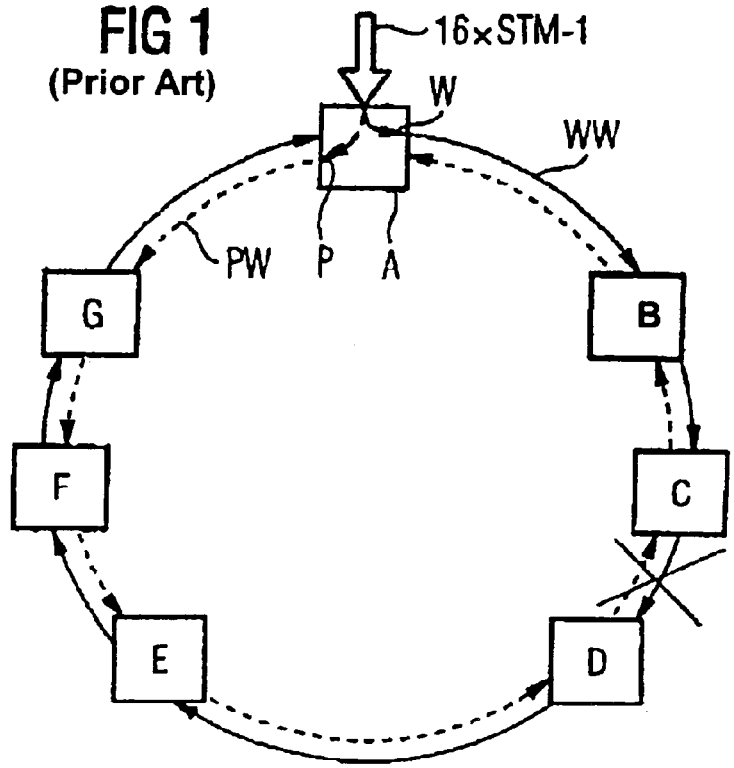
FIG. 1 shows a construction and the data transport paths of a conventional ring network.

FIG. 1 illustrates a ring network which is known in the prior art. In this figure, a central network element A and a multiplicity of network elements B to G are arranged in the ring. 16×STM-1 signals, e.g. from a central internet server, are fed into the central network element A of the ring, in which the data is transmitted via a synchronous transfer mode STM. In the central network element A, the data is fed into the ring both in the clockwise direction as working signals W on a working path WW and in the counterclockwise direction as protection signals P in a protection path PW. The working path WW is represented by a solid line and the protection path PW is represented by a broken line.

In the event of an interruption in the ring, e.g. between the network element C and the network element D, the network elements B and C continue to be reached via the working path. The network elements D to G, in contrast, are supplied with the protection signals P.

The protection method used is a subnetwork connection protection SNCP method, also referred to as path protection method. This method is suitable, in particular, in the case of data traffic directed one-way since it offers the same transmission capacity in the ring as a shared ring protection method. In this method, the control of the working and protection signals is simple to achieve since there is no need for any changeover protocols for a changeover in the network elements. The changeover in the network elements is, in each case, effected at the receiving end on the basis of local information.

Figure 2:
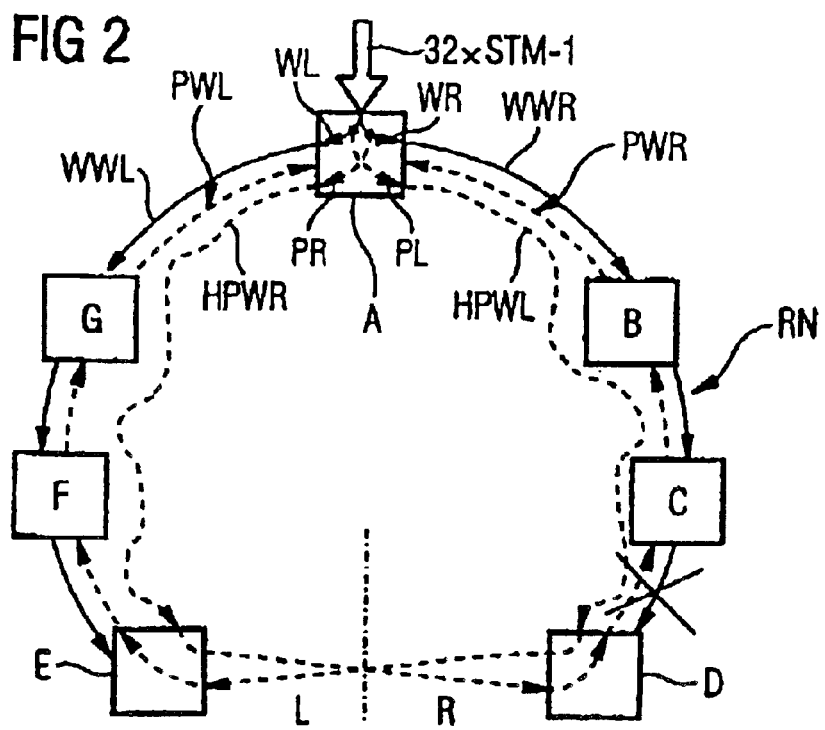
FIG. 2 shows a construction and the data transport paths of a ring network according to the teachings of the present inventions.

FIG. 2 illustrates the data paths within the ring according to the present invention. The working path WWR, WWL is represented by a solid line and the protection path PWR, PWL is represented by a broken line. In the case of the method of the present invention, the ring is logically subdivided into two ring halves, proceeding from the network element A. 32×STM-1 signals are fed into the ring by the central network element A, which also can be referred to as gateway node A. In this case, 16×STM-1 signals are fed into the ring as working signals WR on the working path WWR in the clockwise direction and 16×STM-1 signals are fed into the ring as working signals WL on the working path WWL in the counterclockwise direction. According to the method of the present invention, the protection signals PR, PL are transmitted on separate paths from the central network node A to the terminating network element pair D, E, between which the first and second parts of the ring adjoin one another. In the figure shown, the logical separating point of the ring subdivided into two ring halves is between the terminating network elements D and E. In the clockwise direction, data fed into the ring is forwarded in the left-hand ring half and, respectively, first part of the ring in the counterclockwise direction as protection signals past the network elements G and F as far as the network element E. Only in the terminating network element E are the protection signals fed into the ring and run in the opposite direction to the working signals in the right-hand ring half and, respectively, into the second part of the ring to the central network node A. The same procedure is effected with the data fed into the left-hand ring half and, respectively, into the first part of the ring. In this case, the protection signals are fed past the network elements B and C and selected only at the terminating network element D and fed into the terminating network element E into the right-hand ring half and run in the opposite transmission direction in the left-hand ring half to the working signals transmitted in the left-hand ring half.

Figure 3:
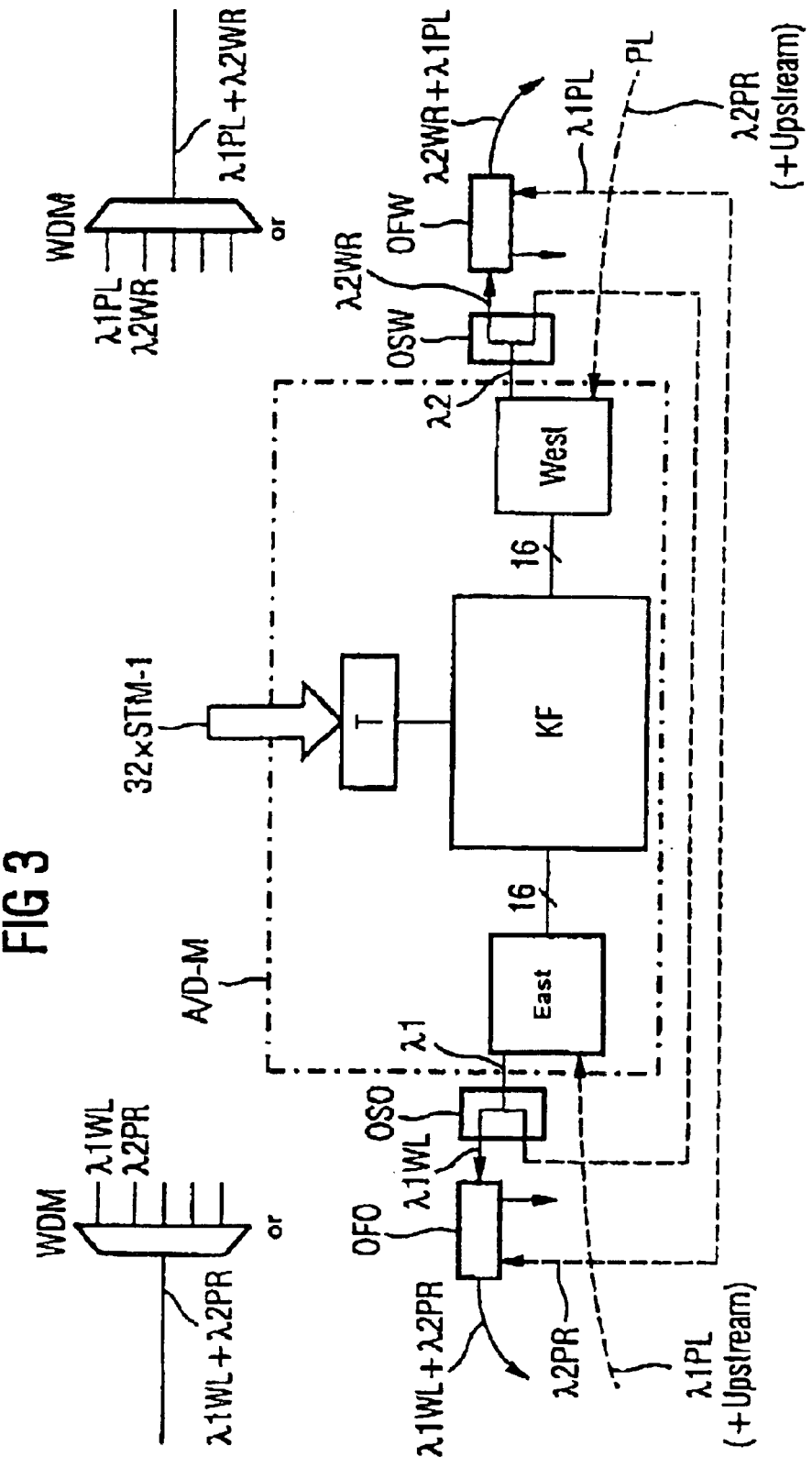
FIG. 3 shows a configuration of a central network elements.

A configuration of the central network node A is represented in FIG. 3. The core of the central network node A is formed by an add/drop multiplexer A/D-MUX, to which 32×STM-1 signals are fed. The add/drop multiplexer A/D-MUX is designed with a tributary connection T, a switching matrix KF and optical STM-16 line interfaces East and West. The line A interfaces East and West output optical signals, formed, for example, by selective lasers with specific wavelengths $\lambda 1$ and $\lambda 2$. There are arranged at the line interfaces East and West, in each case in series, an optical splitter OSO, OSW and an optical filter OFO, OFW. In the optical splitter OSO, the optical signal $\lambda 1$ is split into working signals $\lambda 1$WL and into protection signals $\lambda 1$PL. In the optical splitter OSW connected to the line interface West, the optical signal $\lambda 2$ is split into working signals $\lambda 2$WR and protection signals $\lambda$PR.

Downstream of the line interface East, in the optical filter OFO, the working signals $\lambda 1$WL of the line interface East and the protection signals $\lambda 2$PR formed in the optical splitter OSW at the line interface West are added and form an optical signal $\lambda 1$WL and $\lambda 2$PR. An optical signal $\lambda 2$WR and $\lambda 1$PL is formed by the optical filter OFW in a corresponding manner in the opposite direction.

The working and protection signals $\lambda 1$WL, $\lambda 2$PR and $\lambda 2$WR, $\lambda 1$PL, respectively, are in each case forwarded to the nearest network elenments G, F, E and B, C, D, respectively.

At both optical filters OFO, OFW, however, there is also the possibility of selecting a desired optical signal.

Instead of the optical filters OFO, OFW, it is also possible to use wavelength division multiplexers WDM. Protection signals and upstream signals pass to the line interfaces East and West from the respectively following network elements.

Figure 4:
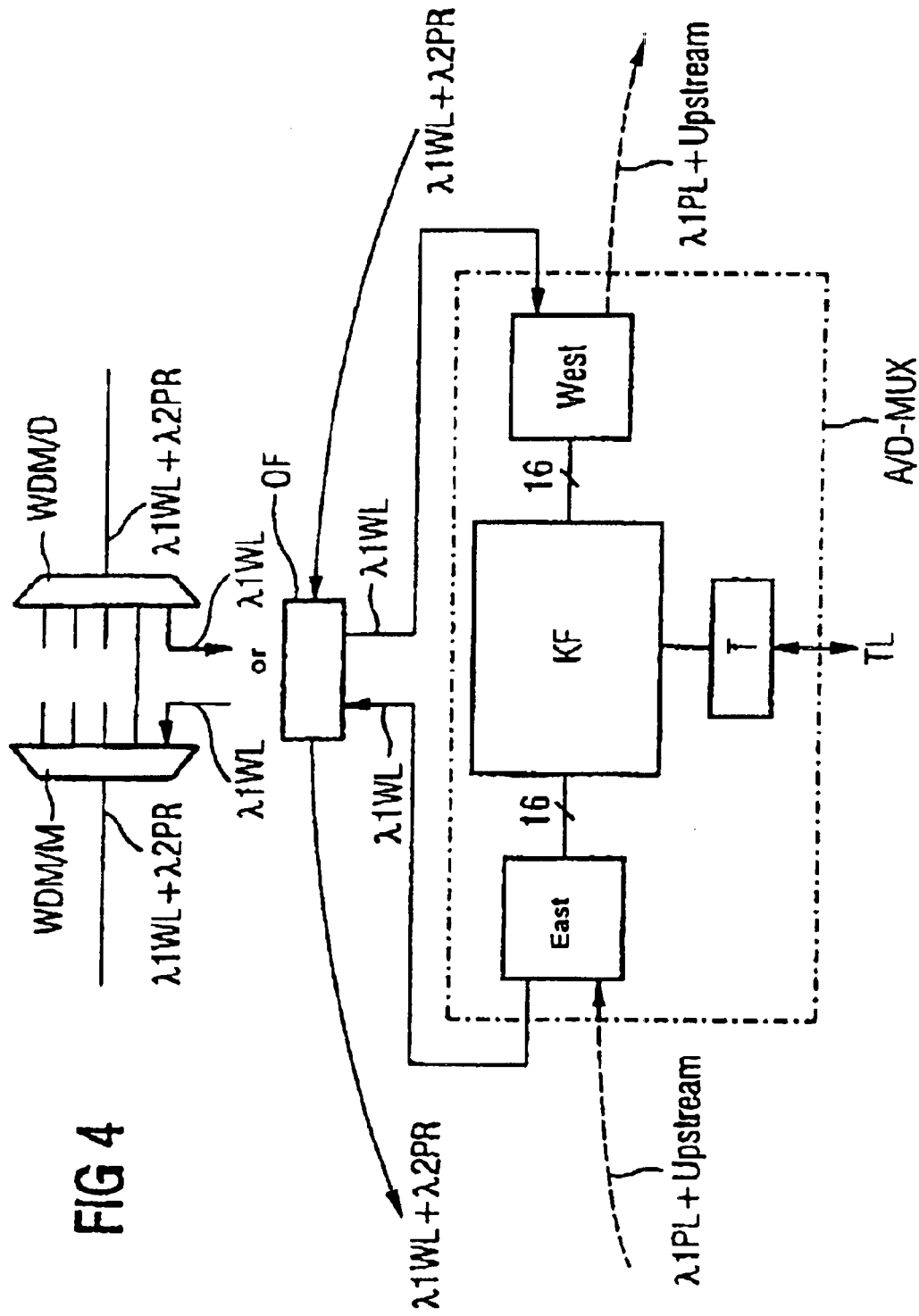
FIG. 4 shows a configuration of a network element.

FIG. 4 shows a configuration of the network elements B, C, F and G of the ring. An optical filter OF or a wavelength division demultiplexer WDM/D; wavelength division multiplexer WDM/M in the network elements F and G in the left-hand ring half taps off from the optical signal $\lambda 1$WL, $\lambda 2$PR the working signal $\lambda 1$WL and allows the protection signal $\lambda 2$PR to pass. Likewise, the protection signal $\lambda 1$PL in the optical filters OF of the network elements B, C in the right-hand ring half are fed past the network elements B, C in the right-hand ring half.

At the line interface West, the working signal $\lambda 1$WL is fed to the add/drop multiplexer A/D-MUX, and through the switching matrix KF, signals intended for subscriber TL connected to this network element are coupled out and passed on to the subscriber TL via a tributary connection T.

Portions of the working signal $\lambda 1$WL that are to be forwarded are coupled via the line interface East once again via the optical filter OF into the data stream on the working path WWL of the ring, so that an optical signal $\lambda 1$WL and $\lambda 2$PR is once again produced. In the opposite direction, at the line interface East, in this case, the protection and upstream signals can be applied to the A/D MUX. In the right-hand half of the ring, via same procedure, a specific signal for a subscriber in the network elements B, C is coupled out, the remainder of the working signal is coupled in again and protection and upstream signals are forwarded.

Figure 5:
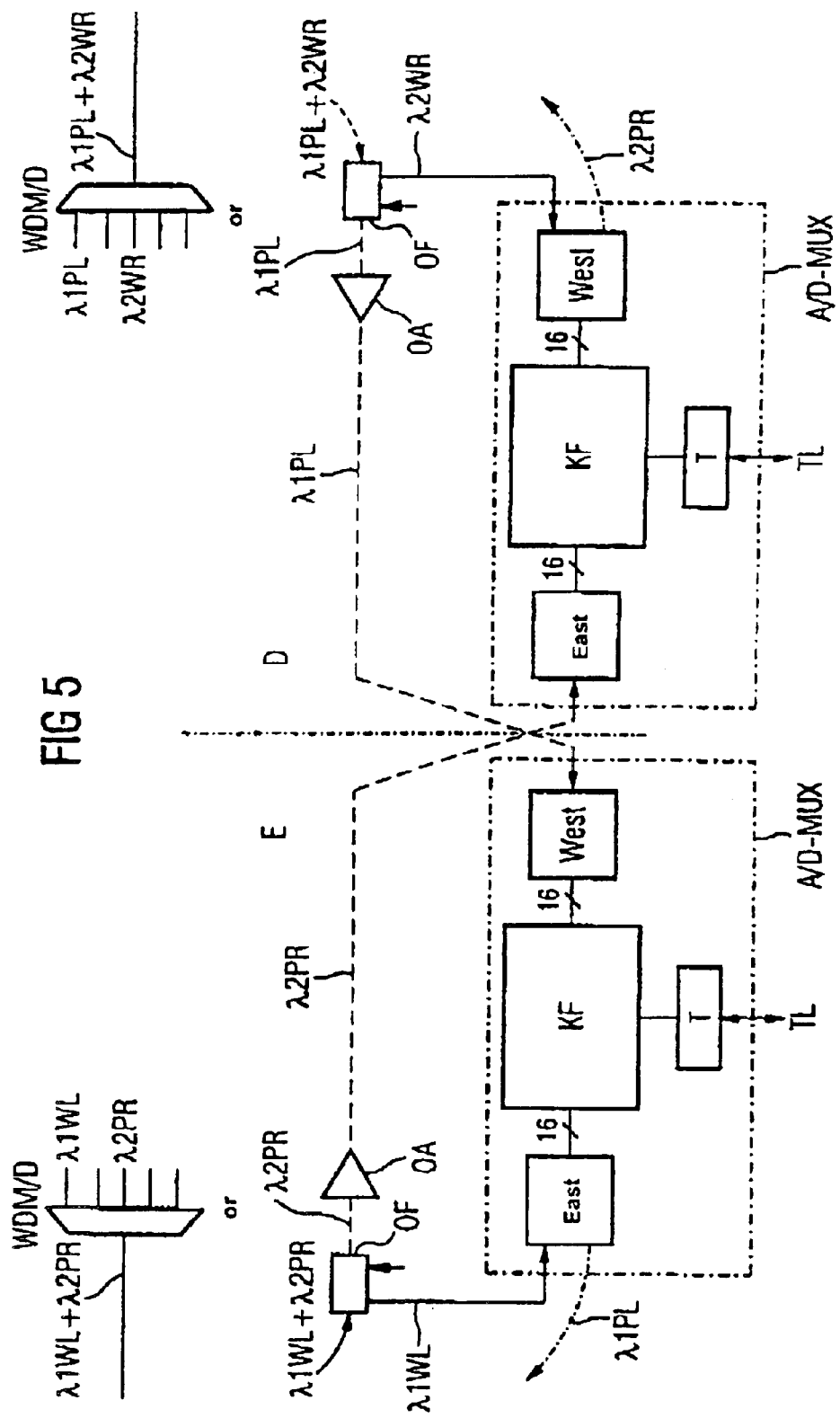
FIG. 5 shows a configuration of network elements which respectively terminate one half of the ring network.

FIG. 5 shows a configuration of the terminating network elements D and E which respectively terminate one half of the ring network. With the aid of an optical filter OF or a wavelength division demultiplexer WDM/D, the working signal $\lambda 1$WL is coupled out from the terminating network element E and fed to a line interface East of the terminating network element E. The protection signal $\lambda 2$PR is fed, if appropriate, via an optical amplifier OA to the line interface East of the terminating network element D. Via the switching matrix KF of the terminating network element D and the line interface West of the terminating network element D, the protection signals $\lambda 2$PR previously forwarded on to the auxiliary protection path HPWR in the left-hand half of the ring pass into the protection path PWR of the right-hand half R of the ring network RN. The protection signals $\lambda 1$PL which were previously forwarded on the auxiliary protection path HPWL in the right-hand half R of the ring network RN pass via the line interface West, the switching matrix KF and via the line interface East into the protection path PWL of the left-hand half L of the ring network.

FIG. 6 shows a further configuration of the network elements D and E which respectively terminate one half of the ring network. This configuration differs from that shown in FIG. 5 by virtue of the fact that data is sent from a subscribers TL connected to these network elements to other network elements or to the central network element A within the left-hand or right-hand half of the ring. In a departure from the illustration from FIG. 5, the protection signal λ2PR is fed from the optical filter OF via a tributary connection to the switching matrix KF of the network element E. The protection upstream data transport is likewise fed in the switching matrix KF. Between the line interfaces East of the network element D and the line interface West of the network element E, the aggregate signal formed from protection signal λ2PR and protection upstream signal, and also the aggregate signal formed from the protection signal λ1PL and protection upstream signal, are output. The upstream data stream in the ring correspondingly reduces the capacity of the data fed into the central network element A.

Although the present invention has been described with reference to specific embodiments, those of skill in the art will recognize that changes may be made thereto without departing from the spirit and scope of the invention as set forth in the hereafter appended claims.

I claim:

1. A ring network, comprising:

a central network element for feeding in data and for distributing both working signals and protection signals on different transmission paths and in oppositely directed transmission directions, and wherein, proceeding from the central network element, the ring network is subdivided into a first part and a second part;

a plurality of further network elements connected to subscribers for forwarding upstream data from the subscribers and for distributing the working signals to the subscribers;

wherein the central network element feeds a respective working signals into the first and second parts of the ring network;

wherein the central network element, in accordance with portions of the respective working signals fed into the first and second parts of the ring network, feeds the working signals as protection signals into the respective other part of the ring network; and wherein the further network elements forward the protection signals as far as the respective network element terminating the first and left-hand parts of the ring network, and the protection signals are fed into the respective other terminating network element of the first and second parts of the ring network and are forwarded counter to a transmission direction of the working signals to the central network element.

2. A ring network as claimed in claim 1, wherein the network elements terminating the first and second parts of the ring network are designed such that the protection signals previously forward at the further network elements are selected and fed into the respective other terminating network element of the first and second parts of the ring network.

3. A ring network as claimed in claim 1, further comprising: optical splitters for splitting the working signals.

4. A ring network as claimed in claim 1, further comprising: one of optical filters and multiplexers for joining together different optical signals.

5. A method for distributing data within a ring network for feeding in data and for distributing both working signals and protection signals on different transmission paths and in oppositely directed transmission directions and for forwarding data from subscribers and for distributing the working signals to the subscribers connected to network elements, the method comprising the steps of:

subdividing the ring network into a first part and a second part;

feeding a working signals into the first part and a working signal into a second part of the ring network;

feeding a working signal as a protection signal into each respective other part of the ring network in accordance with the respective working signals fed into the first and second parts of the ring network;

forwarding the protection signals as far as the respective network element terminating the first and second parts of the ring network;

feeding the protection signals into the respective other terminating network element of the first and second parts of the ring network; and forwarding the protection signals counter to a transmission direction of the working signals to the central network element.

6. A method for distributing data within a ring network as claimed in claim 5, the method further comprising the steps of:

selecting, in the terminating network elements, the protection signals forwarded at the further network elements; and feeding the protection signals into the respective other terminating network element of the first and second parts of the ring.

* * * * *